United States Patent [19]

Martineau

[11] 4,221,117
[45] Sep. 9, 1980

[54] AERATOR PROPORTIONER FOR FROZEN COMESTIBLE FREEZERS

[75] Inventor: Tom N. Martineau, Kiel, Wis.

[73] Assignee: Stoelting, Inc., Kiel, Wis.

[21] Appl. No.: 4,637

[22] Filed: Jan. 19, 1979

[51] Int. Cl.² .............................................. A23G 9/00
[52] U.S. Cl. ...................................... 62/306; 62/308; 62/342
[58] Field of Search ................ 62/342, 343, 306, 308, 62/189; 366/102, 107; 137/212, 587; 261/84

[56] References Cited
U.S. PATENT DOCUMENTS

| | | | |
|---|---|---|---|
| 1,329,074 | 1/1920 | Fehan | 137/587 X |
| 1,576,662 | 3/1926 | Leonard | 137/212 |
| 2,331,001 | 10/1943 | Simon | 137/212 |
| 2,409,339 | 10/1948 | Ballard | 366/177 |
| 2,749,930 | 6/1956 | Whitnall | 137/212 |
| 3,030,976 | 4/1962 | Brown et al. | 62/342 X |
| 3,183,681 | 5/1965 | Lutz et al. | 62/342 X |
| 3,724,234 | 4/1973 | Garavelli | 62/308 |
| 3,885,587 | 5/1975 | Troope | 366/177 X |

*Primary Examiner*—William E. Wayner
*Assistant Examiner*—William E. Tapolcai, Jr.
*Attorney, Agent, or Firm*—Wheeler, Morsell, House & Fuller

[57] ABSTRACT

A frozen comestible freezer has a freezing chamber, a receiving chamber, and a tank of liquid comestible which is fed to the receiving chamber through an aerator proportioner which provides the correct proportion of liquid comestible and air for the aerator. The aerator proportioner has a feed tube solely for liquid comestible and an air tube solely for air. The tubes are mounted on a multi-level plug in the passage between the tank and the receiving chamber. The plug has a high level portion and a low level portion. The air tube extends through the high level portion of the plug and the liquid comestible feeding tube extends downwardly from the low level portion of the plug. A finger grip is provided on the high level portion of the plug. The low level portion of the plug constitutes a liquid comestible sump.

7 Claims, 7 Drawing Figures

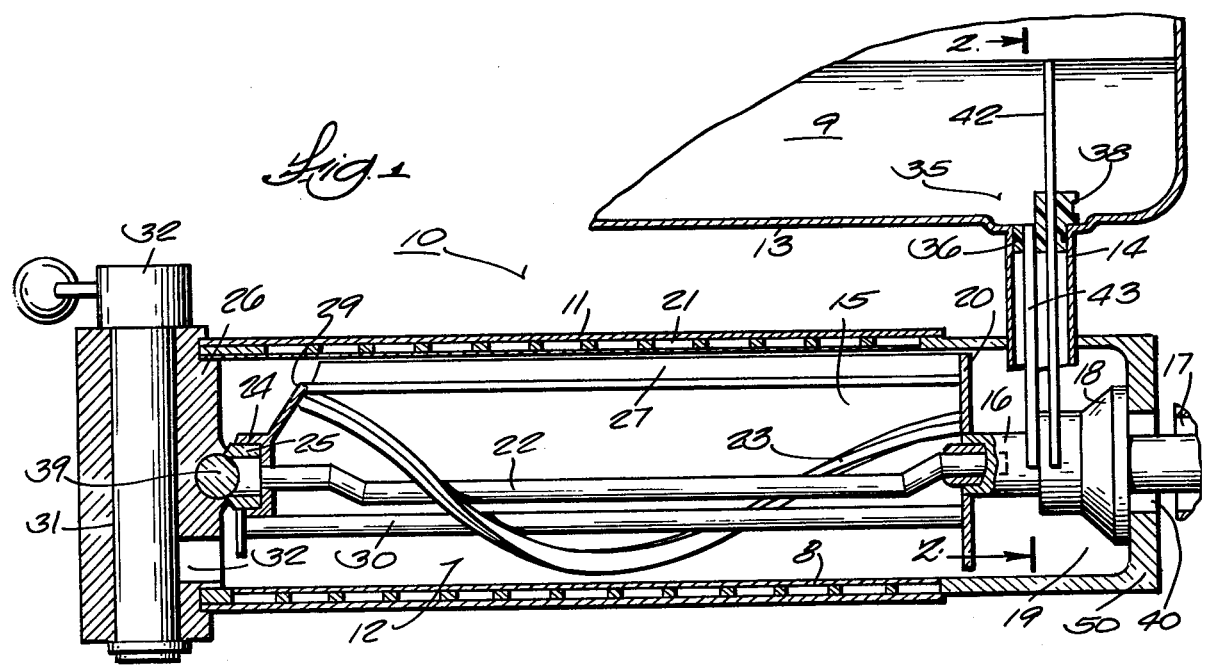
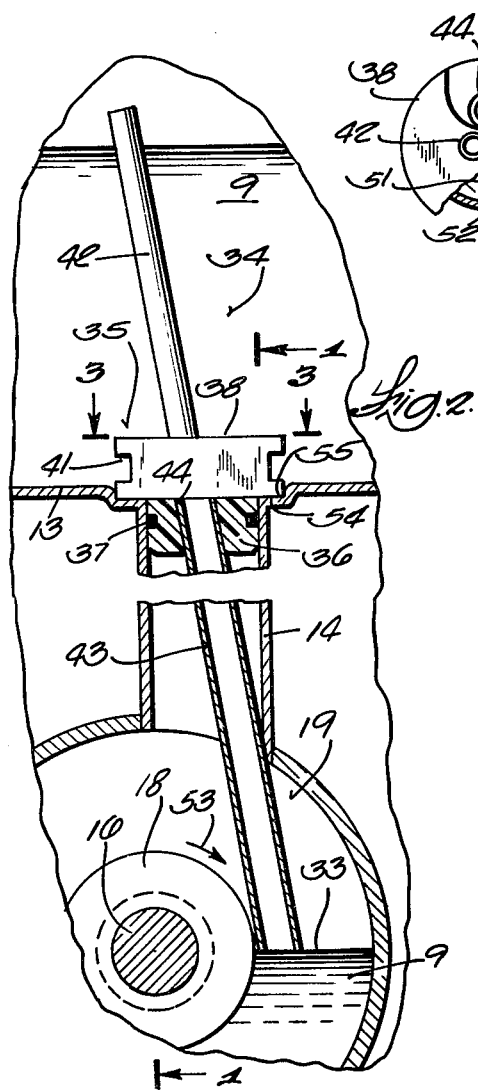
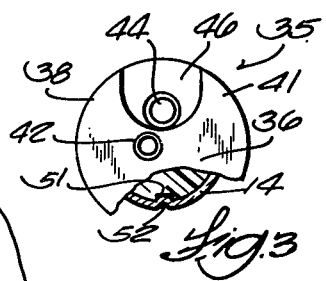
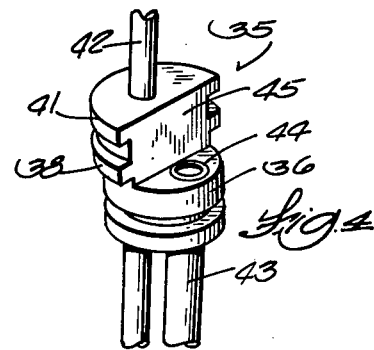
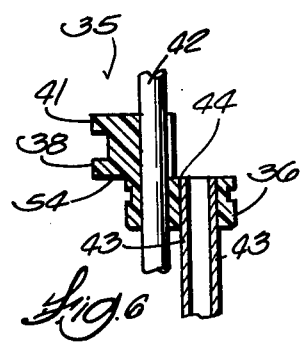
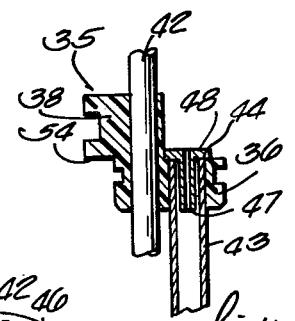
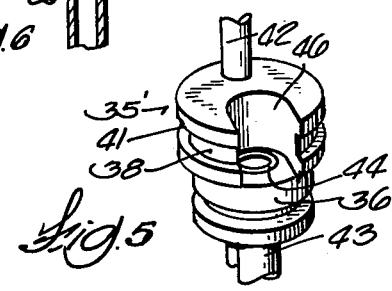

AERATOR PROPORTIONER FOR FROZEN COMESTIBLE FREEZERS

BACKGROUND OF THE INVENTION

U.S. Pat. Nos. 2,924,952; 3,222,035 and 3,365,903 disclose prior art devices for proportioning liquid comestible with air en route from a liquid comestible tank to a freezing chamber in which the liquid comestible and air are blended and cooled to a serving consistency. The prior art devices do not achieve accurate proportioning, primarily because these prior art devices add air to liquid comestible in a single tube. This can create air bubbles in the liquid comestible in the combined air and liquid fill tube of the prior art and result in irregular feed and improper proportions thereof.

SUMMARY OF THE INVENTION

The proportioner of the present invention improves over the prior art devices in that the air tube and liquid comestible feed tube are entirely separate so that air and liquid comestible do not come together until after they are discharged separately into the receiving chamber. No attempt is made to mix air and liquid in the fill tube, thus avoiding air bubble generation and non-uniformity or irregular flow therethrough. The fill tube is exposed only to the liquid comestible and the air tube is exposed only to air, thus keeping them separate until they are discharged into the receiving chamber.

By eliminating addition of the air to the liquid comestible in a single tube, the air tube utilized in the apparatus of the present invention can be much smaller in cross section than the combined air and liquid fill tube utilized in prior art apparatus. This greatly reduces the quantity of liquid comestible that will collect in the air tube during frequent lulls in dispensing demand for frozen comestible, the collection of which inhibits accurate proportioning of air and liquid in prior art devices. Where a combined air and liquid fill tube is used, as in the prior art, this collected liquid comestible blocks admission of air into the receiving chamber until the collected liquid clears the tube. By using a small air tube in accordance with the present invention, the small amount of collected liquid comestible in the air tube will quickly clear when the apparatus begins to dispense frozen comestible and thus admit air into the receiving chamber almost immediately after the dispensing operation begins. In some embodiments of the present invention, the air tube has only about one-fourth the capacity to store collected liquid comestible as the prior art devices with larger combined air and liquid fill tubes. The proportioner tube support plug desirably has a high level portion through which the air tube extends and has a peripheral finger grip to facilitate manual manipulating of the plug with respect to its seat. The finger grip portion is high enough in the tank to be easily reached by the operator. The plug also has a low level portion from which the liquid mix tube extends downwardly. This low level portion constitutes a liquid mix sump to facilitate drainage of the liquid mix from the tank into the fill tube.

In some embodiments, the air and fill tube are inclined at an angle to the axis of the passage whereby the lower ends thereof are offset toward one side of the receiving chamber and away from the drive shaft of the blending auger in the freezing chamber. The plug and passage are desirably provided with a key for locating the plug in a position in which the offset aforesaid is maintained.

One or more drop-in inserts for the liquid comestible feeding tube may also be provided whereby to readily change the feed rate of the fill tube.

Other objects, features and advantages of the invention will appear from the disclosure hereof.

DESCRIPTION OF THE DRAWINGS

FIG. 1 is a fragmentary vertical longitudinal section taken through a frozen comestible freezer embodying the present invention, along the line 1—1 of FIG. 2.

FIG. 2 is a fragmentary cross section taken along the line 2—2 of FIG. 1.

FIG. 3 is a plan view of one embodiment of plug taken along the line 3—3 of FIG. 2, portions of the plug being broken away to expose details.

FIG. 4 is a perspective view of another embodiment of plug.

FIG. 5 is a perspective view of said one embodiment of plug.

FIG. 6 is a vertical cross section taken through a plug embodying the invention.

FIG. 7 is a view similar to FIG. 6, but showing a drop-in insert tube positioned in the liquid comestible fill tube.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Frozen confection freezer 10 comprises a horizontally elongated cylinder 11 enclosing a cylindrical freezing chamber 15 having its inner wall 8 cooled by refrigeration ducts 21. Freezing chamber 15 contains an auger type blender, agitator and aerator 12 mounted for rotation substantially on the axis of the cylinder 11. Liquid comestible 9 in tank 13 and air are fed through tubes 42, 43 through the pipe or passageway 14 into the receiving chamber 19 which is adjacent freezing chamber 15 and partially partitioned therefrom by the disk 20.

The aerator and agitator 12 may be made in any desired form. It draws liquid confection 9 and air from receiving chamber 19 through the peripheral gap between disk 20 and the wall 8 of cylinder 11 and agitates, mixes and blends the air and liquid to aerate the liquid and cool the aerated mixture to the desired serving consistency. The proportion of air and liquid in the final mix will depend upon the proportion of air and liquid in receiving chamber 19, and this depends upon the proper functioning of the proportioner hereinafter described.

The illustrated aerator and agitator 12 has a drive shaft 16 mounted at one end on an external bearing 17. The opening 40 in the end wall 50 of freezer 11 through which drive shaft 16 extends is sealed by a rubber cup seal 18. Drive shaft 16 carries the disk 20 to which ends of auger blade 23, scraper blade 27 and stay rod 30 are attached. At the end of the blender 12 remote from the disk 20 there is a bearing hub 24 which is supported on a bearing boss 25 from the end wall or door 26 which closes the end of freezing chamber 15. Hub 24 carries a bracket 29 to support the respective ends of scraper blade 27 and auger blade 23 which are remote from disk 20. Hub 24 also supports the end of stay rod 30 at its end remote from disk 20. When drive shaft 16 is turned by a motor (not shown), the stay rod 30, scraper blade 27 and auger blade 23 rotate as a unit. Blender bar 22 is held stationary by its anchor rod 39 which is seated in a corresponding groove in the side of end wall 26. Details of the auger type blender 12 are also shown in copending United States patent application Ser. No. 4,639 filed Jan. 19, 1979.

The end wall 26 of freezing chamber 15 has a dispenser nozzle 31 with a handle 32 by which frozen confection of serving consistency is dispensed from the freezing chamber 15 through duct 32.

The aerator proportioner 34 in passage 14 includes a mounting plug 35. It desirably has a lower level portion 36 which seats into the passage 14 and is sealed thereto by O-ring 37. The upper level portion 38 of the plug 35 is considerably elevated above the bottom wall of tank 13 and is provided with a peripheral finger grip portion 41 so that it can be readily grasped by an operator for purposes of manual manipulation of the plug for inserting it into the passage 14 and removing it therefrom.

Plug 35 provides support means for an air tube 42 and a liquid comestible fill tube 43. Air tube 42 extends through the plug 35 and through the upper level portion 38 thereof. Air tube 42 projects downwardly through the passage 14 into the receiving chamber 19 and also extends upwardly from the plug 35 above the level of the liquid comestible 9 in tank 13, so as to have its upper end exposed to the air of the atmosphere.

The lower level portion 36 of the plug 35 carries a liquid comestible fill tube 43 which extends downwardly through the passage 14 into the receiving chamber 19. The bottom ends of the air tube 42 and liquid fill tube 43 are desirably at the same level in receiving chamber 19, as shown in FIG. 1. This level may be adjusted to change the proportion or over-run of air to liquid in the final mixture. When frozen confection is drawn from the dispensing spout 31, and blender 12 is turning in the direction of arrow 53 in FIG. 2, it draws liquid 9 and air from receiving chamber 19 into freezing chamber 15. This lowers the level 33 of liquid in receiving chamber 19 and uncovers the lower ends of air tube 42 and fill tube 43. Liquid 9 will then flow by gravity and suction from tank 13 through fill tube 43 into receiving chamber 19. Air will be drawn by suction down air tube 42 into receiving chamber 19. The flow rates in tubes 42, 43 will be uniform and precise because each carries only air or liquid and no attempt is made to mix the two in these tubes. When the liquid level 33 rises in chamber 19 to or above the lower ends of tubes 42, 43, both liquid flow and air flow into receiving chamber 19 is simultaneously stopped. Accordingly, the proportion of air to liquid is automatically regulated by the rising and falling level 33 of liquid 9 and the initial adjustment of the level of the lower ends of tubes 42, 43 in receiving chamber 19. To increase air over-run, the tubes 42, 43 have their lower ends at a lower level in receiving chamber 19.

The upper end 44 of the fill tube 43 terminates at the level of the lower portion 36 of the plug 35 so as to be as low as possible in the tank 13, so as to function as a sump for good drainage of the liquid mix from the tank 13 into the fill tube 43.

The plug 35 may take different forms. In the embodiment of FIG. 4, the side wall 45 of the upper portion 38 of the plug 35 is flat to provide a large sump area and good exposure of the fill tube 43 to the liquid 9 in tank 13. In the embodiment shown in FIGS. 3 and 5, the upper portion 38 of the plug is provided with a semi-circular recess 46 which provides a smaller sump for the fill tube 43. In the smaller sump embodiment shown in FIGS. 3 and 5, the peripheral finger grip portion 41 of the upper portion 35 of the plug has greater peripheral extent than it does in the embodiment of the larger sump in FIG. 4.

As best shown in FIG. 2, both tubes 42, 43 are inclined or slanted at an angle to the axis of the passage 14, so that the lower ends of the tubes are offset outwardly from the center of the receiving chamber 19 and toward the outside wall thereof. This offset clears interference between the lower ends of the tubes 42, 43 and the drive shaft 16 and its rubber seal cup 18. The slanted tube configuration is utilized primarily where the axis of passage 14 intersects the drive shaft 16 and/or seal cup 18. If the passage 14 itself is offset to the right in FIG. 2 so that its axis is offset from the drive shaft 16 and/or seal cup 18, the slant would not be required and the tubes 42, 43 could be parallel to the axis of passage 14.

The plug 35 may be oriented in passage 14 to offset tubes 42, 43 as shown in FIG. 2 by providing the plug 35 with a key groove 51 and the passage wall 14 with a key rib 52 (FIG. 3). These act as a detent to orient the slant of tubes 42, 43 to produce the previously described offset. Any other suitable form of detent can be utilized for this purpose.

The upper portion 38 of plug 35 is larger in diameter than the lower portion 36 of the plug 35. The two parts meet at a shoulder 54 which fits into a recessed seat 55 formed in the bottom of tank 13 about the entrance to passage 14. The interface between seat 55 and plug shoulder 54 keys the plug 35 to fit squarely across the passage and hold the tubes 42, 43 properly oriented therein.

As previously stated, air tube 42 is smaller in cross section than the combined air and liquid fill tube of the prior art. In one practical embodiment of the invention, air tube 42 has an inside diameter of one-fourth of an inch. This compares with about one-half of an inch for the combined air and liquid mix tubes of prior art devices. Thus the volume of liquid mix which rises in the air tube of the present invention to collect therein during lulls in dispensing demand for frozen comestible is only one-fourth of the volume of liquid mix which rises in the combined air and liquid fill tube of the prior art device. Accordingly, the air tube of the present invention is cleared much faster than the combined air and liquid mix tube of the prior art when dispensing resumes.

Moreover, the air drawn in through air tube 42 is unmixed with any liquid comestible, unlike the prior art devices in which both the air and liquid comestible are supplied through the same tube.

Accordingly, the present invention provides for a more uniform and controllable flow of air and liquid and a more accurate proportioning therebetween.

As shown in FIG. 7, the size of the fill tube 43 can readily be changed by selectively inserting and removing drop-in insert tubes 47. In the practical embodiment of the invention previously mentioned, fill tube 43 has an internal diameter of three-eighths of an inch. Such drop-in insert tubes have a top flange 48 which supports the tubes 47 on the upper end 44 of the fill tube 43. When there is no insert in place, the fill tube 43 has a large capacity. When insert 47 is positioned as shown in FIG. 7, the capacity of the fill tube 43 is materially reduced. Several such inserts of different sizes may be utilized to adjust the proportion to operating conditions and to the consistency of the frozen confection being processed in the apparatus.

I claim:

1. In a non-pressurized frozen comestible freezer having a freezing chamber in which a mixture of liquid comestible and air are blended and cooled to a serving consistency, an air and liquid comestible receiving chamber adjacent to and communicating with said freezing chamber, a supply tank for liquid comestible, a passage between said tank and receiving chamber and an aerator proportioner to feed desired proportions of liquid comestible and air from the tank to the receiving chamber, the improvement in which said aerator proportioner comprises support means for supporting tubes in said passage, a liquid comestible feeding tube having a continuous side wall with upper and lower ends, said tube being mounted on said support means and extending through said passage into said receiving chamber, the upper end of said liquid comestible feeding tube terminating near the bottom of the tank to be exposed solely to liquid comestible in said tank and to be isolated by the liquid comestible in said tank from air above the level of liquid comestible in said tank whereby to carry only liquid comestible delivered by gravity flow from said tank to said freezing chamber, and a separate air tube mounted on said support means and extending through said passage into the receiving chamber, said air tube having a continuous side wall with upper and lower open ends, the upper end of said air tube being disposed above the level of liquid comestible in said tank to be exposed solely to air thereabove whereby to carry only air and said lower ends of said air tube and said feed tube being positioned at a selected height within said freezing chamber to maintain the level of mix at the height of said air tube lower end to provide the desired consistency of frozen comestible.

2. The improvement of claim 1 in which said air tube has a cross section materially smaller than the cross section of the liquid comestible feeding tube.

3. The improvement of claim 1 in which said support means comprises a plug having a shoulder, said tank having a plug seat adjacent said passage, said plug shoulder being engaged on said seat whereby to orient said tubes within said passage.

4. The improvement of claim 1 in which said air and fill tubes are inclined at an angle to the axis of said passage, whereby the lower ends thereof are offset toward one side of the freezing chamber.

5. In a frozen comestible freezer having a freezing chamber in which a mixture of liquid comestible and air are blended and cooled to a serving consistency, an air and liquid comestible receiving chamber adjacent to and communicating with said freezing chamber, a supply tank for liquid comestible, a passage between said tank and receiving chamber and an aerator proportioner to feed desired proportions of liquid comestible and air from the tank to the receiving chamber, the improvement in which said aerator proportioner comprises support means for supporting tubes in said passage, a liquid comestible feeding tube mounted on said support means and extending through said passage into said receiving chamber, the upper end of said liquid comestible feeding tube terminating near the bottom of the tank to be exposed solely to liquid comestible in said tank and to be isolated by the liquid comestible in said tank from air above the level of liquid comestible in said tank whereby to carry only liquid comestible, and an air tube mounted on said support means and extending through said passage into the receiving chamber, the upper end of said air tube being disposed above the level of liquid comestible in said tank to be exposed solely to air thereabove whereby to carry only air and wherein said support means comprises a plug having a high level portion and a low level portion, said air tube extending through the high level portion and the liquid comestible feeding tube extending downwardly from the low level portion of the plug, said high level portion of the plug having a peripheral finger grip to facilitate manipulation of the plug and said low level portion of the plug constituting a liquid comestible sump to facilitate drainage of the liquid comestible from the tank into the liquid comestible filling tube.

6. In a frozen comestible freezer having a freezing chamber in which a mixture of liquid comestible and air are blended and cooled to a serving consistency, an air and liquid comestible receiving chamber adjacent to and communicating with said freezing chamber, a supply tank for liquid comestible, a passage between said tank and receiving chamber and an aerator proportioner to feed desired proportions of liquid comestible and air from the tank to the receiving chamber, the improvement in which said aerator proportioner comprises support means for supporting tubes in said passage, a liquid comestible feeding tube mounted on said support means and extending through said passage into said receiving chamber, the upper end of said liquid comestible feeding tube terminating near the bottom of the tank to be exposed solely to liquid comestible in said tank and to be isolated by the liquid comestible in said tank from air above the level of liquid comestible in said tank whereby to carry only liquid comestible, and an air tube mounted on said support means and extending through said passage into the receiving chamber, the upper end of said air tube being disposed above the level of liquid comestible in said tank to be exposed solely to air thereabove whereby to carry only air, said air and fill tubes being inclined at an angle to the axis of said passage, whereby the lower ends thereof are offset toward one side of the freezing chamber, and in which said support means comprises a plug and means for keying a seated portion of the plug in the passage to insure the proper offset of the lower ends of the tubes toward said one side of the freezing chamber.

7. In a frozen comestible freezer having a freezing chamber in which a mixture of liquid comestible and air are blended and cooled to a serving consistency, an air and liquid comestible receiving chamber adjacent to and communicating with said freezing chamber, a supply tank for liquid comestible, a passage between said tank and receiving chamber and an aerator proportioner to feed desired proportions of liquid comestible and air from the tank to the receiving chamber, the improvement in which said aerator proportioner comprises support means for supporting tubes in said passage, a liquid comestible feeding tube mounted on said support means and extending through said passage into said receiving chamber, the upper end of said liquid comestible feeding tube terminating near the bottom of the tank to be exposed solely to liquid comestible in said tank and to be isolated by the liquid comestible in said tank from air above the level of liquid comestible in said tank whereby to carry only liquid comestible, and an air tube mounted on said support means and extending through said passage into the receiving chamber, the upper end of said air tube being disposed above the level of liquid comestible in said tank to be exposed solely to air thereabove whereby to carry only air and including an insert for the liquid comestible feeding tube whereby to partially block said tube and change the feed rate thereof.

* * * * *